United States Patent
Liu et al.

(10) Patent No.: US 12,373,913 B2
(45) Date of Patent: Jul. 29, 2025

(54) METHOD, ELECTRONIC DEVICE, AND COMPUTER PROGRAM PRODUCT FOR PROCESSING POINT CLOUD

(71) Applicant: Dell Products L.P., Round Rock, TX (US)

(72) Inventors: Zhisong Liu, Shenzhen (CN); Zijia Wang, WeiFang (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 481 days.

(21) Appl. No.: 17/940,733

(22) Filed: Sep. 8, 2022

(65) Prior Publication Data

US 2024/0013342 A1    Jan. 11, 2024

(30) Foreign Application Priority Data

Jul. 11, 2022 (CN) .......................... 202210814554.X

(51) Int. Cl.
*G06T 3/40* (2024.01)
*G01S 17/89* (2020.01)

(52) U.S. Cl.
CPC ................ *G06T 3/40* (2013.01); *G01S 17/89* (2013.01)

(58) Field of Classification Search
CPC .......... G06F 18/2413; G06F 18/24323; G06N 3/042; G06N 3/045; G06N 3/084; G06N 5/022; G06V 10/255; G06V 10/426; G06V 10/764; G06V 10/82
See application file for complete search history.

(56) References Cited

U.S. PATENT DOCUMENTS

| | | | |
|---|---|---|---|
| 11,908,168 B2* | 2/2024 | Lee | G06T 9/001 |
| 2019/0087979 A1* | 3/2019 | Mammou | H04N 19/597 |
| 2019/0156518 A1* | 5/2019 | Mammou | G06T 19/20 |
| 2020/0014953 A1* | 1/2020 | Mammou | H04N 19/17 |

(Continued)

OTHER PUBLICATIONS

Ruihui Li et al., "PU-GAN:a Point Cloud Upsampling Adversarial Network," Oct. 2019, Proceedings of the IEEE/CVF International Conference on Computer Vision (ICCV), 2019,pp. 7203-7210.*

(Continued)

*Primary Examiner* — Omar S Ismail
(74) *Attorney, Agent, or Firm* — Ryan, Mason & Lewis, LLP

(57) ABSTRACT

Embodiments of the present disclosure relate to a method, an electronic device, and a computer program product for processing point clouds. The method includes performing upsampling on a first feature of a first point cloud of a target object. The method further includes determining a reference feature of a second point cloud of a reference object. The method further includes determining a second feature based on the first feature subjected to upsampling and the reference feature. The method further includes generating a third point cloud of the target object based on the second feature and the second point cloud of the reference object, where the third point cloud has a larger number of points than the first point cloud. Through embodiments of the present disclosure, a point cloud of the target object can be made denser, with increased accuracy, thereby providing a more detailed description of the target object.

20 Claims, 10 Drawing Sheets

(56) References Cited

U.S. PATENT DOCUMENTS

| | | | |
|---|---|---|---|
| 2020/0020132 A1* | 1/2020 | Sinharoy | H03M 7/70 |
| 2020/0021847 A1* | 1/2020 | Kim | H04N 19/597 |
| 2020/0111237 A1* | 4/2020 | Tourapis | G06T 9/001 |
| 2020/0158869 A1* | 5/2020 | Amirloo Abolfathi | G06T 7/521 |
| 2021/0104090 A1* | 4/2021 | Hur | G06T 15/005 |
| 2021/0227232 A1* | 7/2021 | Oh | H04N 21/4347 |
| 2021/0374978 A1* | 12/2021 | Döring | G06T 7/33 |
| 2021/0398338 A1* | 12/2021 | Philion | G06V 10/774 |
| 2022/0094982 A1* | 3/2022 | Iguchi | H04N 19/597 |

OTHER PUBLICATIONS

Yifei Tian et al., "3D object recognition method with multiple feature extraction from LiDAR point clouds," Mar. 30, 2019, The Journal of Supercomputing (2019) 75,pp. 4430-4440.*

Wentai Zhang et al.,"Data-driven Upsampling of Point Clouds," Mar. 19, 2019,Computer-Aided Design 112(2019),Jul. 2019, pp. 1-10.*

Yue Wang et al.,"Dynamic Graph CNN for Learning on Point Clouds," Oct. 2019,ACM Transactions on Graphics, vol. 38, No. 5, Article 146:2-146:10.*

Wang Yifan et al.,"Patch-based Progressive 3D Point Set Upsampling," Jun. 2019, Proceedings of the IEEE/CVF Conference on Computer Vision and Pattern Recognition (CVPR), 2019,pp. 5958-5965.*

Lequan Yu et al.,"PU-Net: Point Cloud Upsampling Network," Jun. 2018, Proceedings of the IEEE Conference on Computer Vision and Pattern Recognition (CVPR), 2018,pp. 2790-2797.*

Yue Qian et al.,"PUGeo-Net: A Geometry-Centric Network for 3D Point Cloud Upsampling," Nov. 13, 2020, Deep Upsampling over 3D Point Clouds,A. Vedaldi et al. (Eds.): ECCV 2020, LNCS 12364, pp. 752-765.*

Elena Camuffo et al.,"Recent Advancements in Learning Algorithms for Point Clouds:An Updated Overview," Feb. 10, 2022, Sensors 2022, 22, 1357,pp. 1-26.*

R. Li et al., "PU-GAN: A Point Cloud Upsampling Adversarial Network," IEEE International Conference on Computer Vision, Nov. 2019, pp. 7203-7212.

L. Yu et al., "PU-Net: Point Cloud Upsampling Network," IEEE Conference on Computer Vision and Pattern Recognition, arXiv:1801.06761v2, Mar. 26, 2018, 15 pages.

W. Yifan et al., "Patch-based Progressive 3D Point Set Upsampling," IEEE Conference on Computer Vision and Pattern Recognition, Jun. 2019, pp. 5958-5967.

Y. Qian et al., "PUGeo-Net: A Geometry-centric Network for 3D Point Cloud Upsampling," arXiv:2002.10277v2, Mar. 7, 2020, 17 pages.

Z.-S. Liu et al., "Image Super-Resolution via Attention based Back Projection Networks," IEEE International Conference on Computer Vision Workshop, arXiv:1910.04476v1, Oct. 10, 2019, 9 pages.

Y. Wang et al., "Dynamic Graph CNN for Learning on Point Clouds," ACM Transaction on Graphics, arXiv:1801.07829v2, Jun. 11, 2019, 13 pages.

U.S. Appl. No. 17/884,684 filed in the name of Zhisong Liu et al. on Aug. 10, 2022, and entitled "Point Cloud Processing Method and Electronic Device."

* cited by examiner

METHOD, ELECTRONIC DEVICE, AND COMPUTER PROGRAM PRODUCT FOR PROCESSING POINT CLOUD

RELATED APPLICATION(S)

The present application claims priority to Chinese Patent Application No. 202210814554.X, filed Jul. 11, 2022, and entitled "Method, Electronic Device, and Computer Program Product for Processing Point Cloud," which is incorporated by reference herein in its entirety.

FIELD

Embodiments of the present disclosure relate to the field of computers, in particular to a method, an electronic device, and a computer program product for processing point clouds.

BACKGROUND

The metaverse is a new trend that provides users with virtual reality experiences. An important issue is whether a metaverse application can be used in a given location without excessive concern about computing and data access delays. In building the metaverse, it is important to have robust and efficient three-dimensional (3D) representations of objects in the real world. One possible approach is to scan objects in the real world using a high-performance hardware device to directly generate dense point clouds. However, such high-performance hardware devices can be unduly expensive. A more cost-effective solution is to sparsely record point clouds of objects by using an inexpensive hardware device with lesser performance, and then to use a computer vision technology (for example, deep learning) to increase the density of the sparsely recorded point cloud so as to achieve a denser point cloud providing a higher-resolution 3D representation of objects in the real world.

SUMMARY

Embodiments of the present disclosure provide a method, an electronic device, and a computer program product for processing point clouds.

According to a first aspect of the present disclosure, a method is provided. The method includes performing upsampling on a first feature of a first point cloud of a target object. The method further includes determining a reference feature of a second point cloud of a reference object. The method further includes determining a second feature based on the first feature subjected to upsampling and the reference feature. The method further includes generating a third point cloud of the target object based on the second feature and the second point cloud of the reference object, where the third point cloud has a larger number of points than the first point cloud.

According to a second aspect of the present disclosure, an electronic device is provided. The electronic device includes a processor and a memory coupled to the processor, wherein the memory has instructions stored therein, and the instructions, when executed by the processor, cause the electronic device to execute actions. The actions include performing upsampling on a first feature of a first point cloud of a target object. The actions further include determining a reference feature of a second point cloud of a reference object. The actions further include determining a second feature based on the first feature subjected to upsampling and the reference feature. The actions further include generating a third point cloud of the target object based on the second feature and the second point cloud of the reference object, where the third point cloud has a larger number of points than the first point cloud.

According to a third aspect of the present disclosure, a computer program product is provided, wherein the computer program product is tangibly stored on a non-transitory computer-readable medium and includes machine-executable instructions, and the machine-executable instructions, when executed by a device, cause the device to execute the method according to the first aspect.

This Summary is provided to introduce the selection of concepts in a simplified form, which will be further described in the Detailed Description below. The Summary is neither intended to identify key features or principal features of the claimed subject matter, nor intended to limit the scope of the claimed subject matter.

BRIEF DESCRIPTION OF THE DRAWINGS

The above and other features, advantages, and aspects of embodiments of the present disclosure will become more apparent in conjunction with the accompanying drawings and with reference to the following Detailed Description. In the accompanying drawings, identical or similar reference numerals represent identical or similar elements, in which.

In all the accompanying drawings, identical or similar reference numerals indicate identical or similar elements.

DETAILED DESCRIPTION

Embodiments of the present disclosure will be described in more detail below with reference to the accompanying drawings. Although the accompanying drawings show some embodiments of the present disclosure, it should be understood that the present disclosure can be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In addition, all specific numerical values herein are examples, which are provided only to aid in understanding, and are not intended to limit the scope.

During modeling of a target object in an environment, due to the limit of hardware device resources, certain types of hardware devices cannot usually be used for scanning the target object directly and then generating point cloud that is dense enough. With the development of computer vision technology and improvement of processing capacity of a computing resource, an effective solution is to sparsely record point cloud of an object by using a hardware device with lesser performance, and then a computer vision technology (for example, deep learning) is used to increase point cloud density so as to achieve a higher-resolution 3D representation of an object in the real world. In a conventional technology, there is substantial noise in an actual environment, so a processed point cloud is not accurate and may depart from a real feature of the target object, and consequently, this kind of technology can achieve a better effect merely on laboratory data (e.g., clean data).

In order to address the above defects, embodiments of the present disclosure provide a solution for processing point clouds. The solution uses a reference point cloud of a reference object as a reference, learns a feature of a point cloud of a target object, and transforms, by using the learned feature, the reference point cloud into a shape of the target object. As the reference point cloud is not affected by noise and the number of points of the reference point cloud is larger than the number of points of the point cloud of the target object, an effect of increasing the density of a point cloud of the target object is realized.

Figure 1:
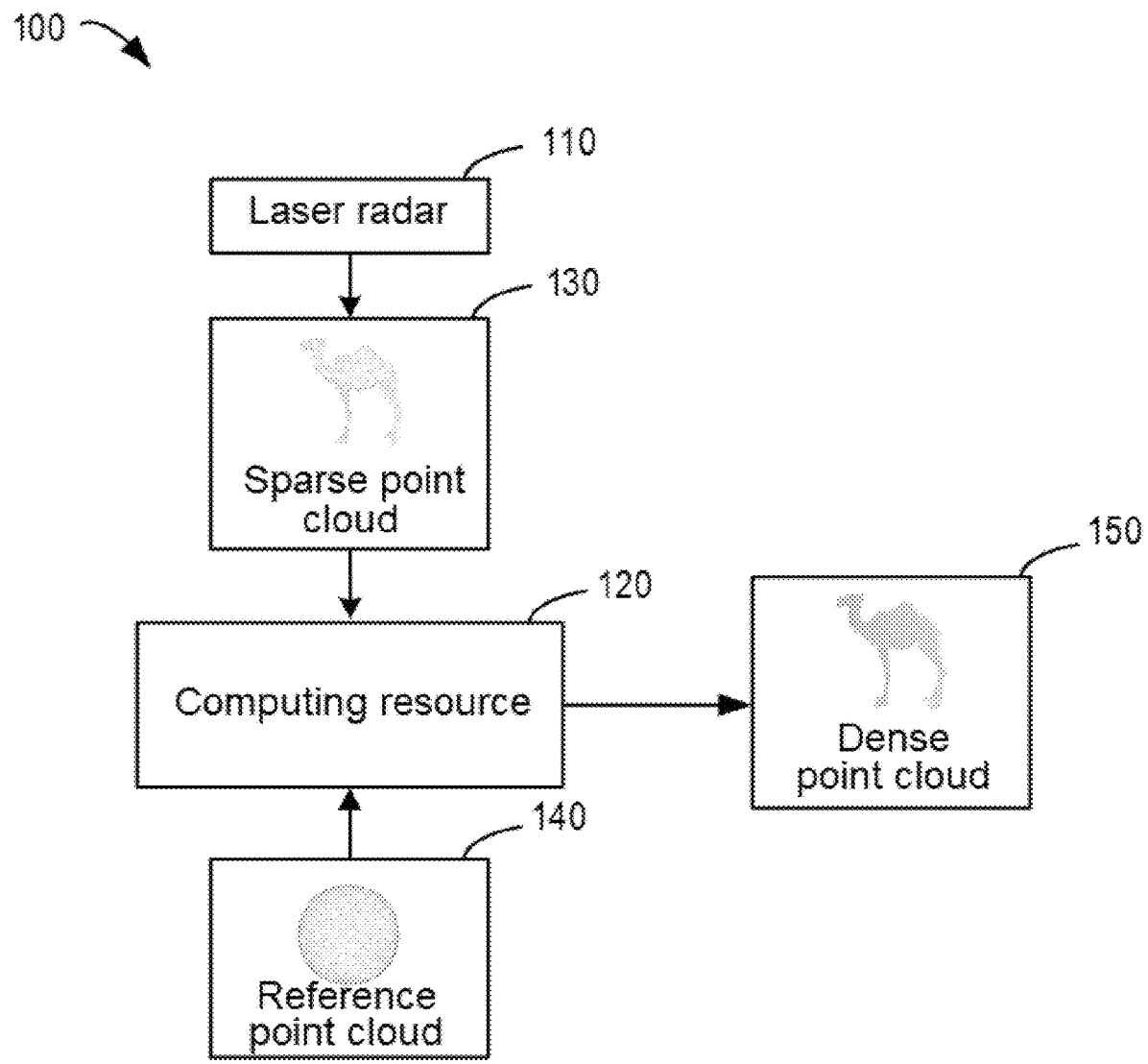
FIG. 1 shows a schematic diagram of an example environment in which an embodiment of the present disclosure may be implemented.

FIG. 1 shows a schematic diagram of example environment 100 in which an embodiment of the present disclosure may be implemented.

As shown in FIG. 1, example environment 100 may include laser radar 110. Laser radar 110 can scan an object in the environment so as to generate a point cloud. The laser radar may comprise, for example, a light detection and ranging (LiDAR) device, or another type of laser radar device. A point cloud refers to a collection of a set of vectors in a three-dimensional coordinate system. The point cloud is usually obtained by scanning with a laser radar, may be construed as reflected echo intensity of the object to the laser radar, and shows a three-dimensional shape of the object and a location of the object in the environment. Certainly, the method of the present disclosure may directly use an obtained point cloud, so laser radar 110 is not always necessarily included in example environment 100, and a point cloud may also be obtained by using other hardware devices.

Computing resource 120 is further included in environment 100. Computing resource 120 may be, for example, a computing system or a server. Computing resource 120 may receive the point cloud of a target object from laser radar 110, or directly obtain a sparse point cloud 130 (also referred to herein as a first point cloud) of the target object in other manners. Computing resource 120 may generate dense point cloud 150 with a larger number of points (also referred to herein as a third point cloud) based on sparse point cloud 130 and reference point cloud 140 (also referred to herein as a second point cloud) of a pre-determined reference object by using the method of the present disclosure.

It should be understood that an architecture and functions of example environment 100 are described for illustrative purposes only, without implying any limitation to the scope of the present disclosure. Embodiments of the present disclosure may also be applied to other environments having different structures and/or functions.

As shown in the figure, sparse point cloud 130 is actually 3D modeling data of an object. Sparse point cloud 130 may represent 3D modeling data of animals (for example, a camel), or sparse point cloud 130 may also represent modeling data of buildings, plants, and the like, which is not limited by the present disclosure. It can be seen that point cloud in sparse point cloud 130 is relatively sparse, so many details cannot be embodied well, which brings about negative effects on a subsequent application (for example, virtual reality).

Reference point cloud 140 is reference point cloud of the pre-determined reference object. The reference object may be a standard ball, so its reference point cloud is also uniform spherical point cloud. "Uniform" means that a distance between each piece of point cloud in the spherical point cloud and its adjacent piece of point cloud is equal. It can be understood that reference point cloud 140 may also be in other shapes, which is not limited by the present disclosure. It can be understood that the number of points in reference point cloud 140 needs to be larger than the number of points in sparse point cloud 130. Here, N represents the number of pieces of point cloud in the sparse point cloud, each piece of point cloud may be represented with three-dimensional coordinates, so the number of points in sparse point cloud is N×3. It can be understood that reference point cloud 140 may have the number of points KN×3, where parameter K is larger than 1, as the number of points of reference point cloud 140 needs to be larger than the number of points of sparse point cloud 130. It can be understood that the laser radar used in the present embodiment may be a laser radar with common performance, and how many times the number of points of the sparse point cloud is increased (for example, being interpolated) may be controlled by means of the parameter K, so that hardware costs can be reduced.

Embodiments of the present disclosure will be described in detail below with reference to FIG. 2 to FIG. 7. For ease of understanding, the specific data mentioned in the following description are all illustrative and are not intended to limit the protection scope of the present disclosure. It can be understood that the embodiments described below may also include additional actions not shown and/or may omit actions as shown, and the scope of the present disclosure is not limited in this regard.

Figure 2:
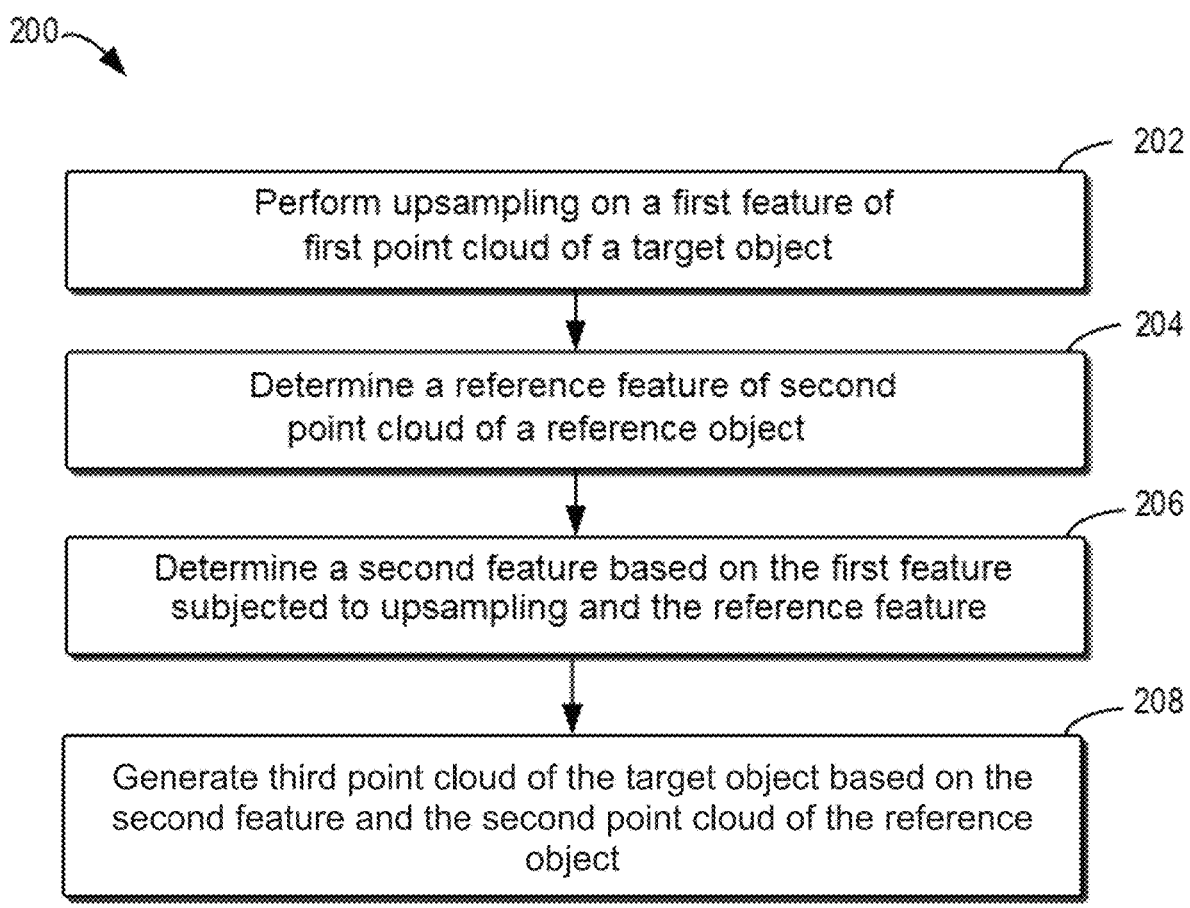
FIG. 2 shows a flow chart of a method for processing point clouds according to an example implementation of the present disclosure.

FIG. 2 shows a flow chart of method 200 for processing point clouds according to an example implementation of the present disclosure.

At block 202, upsampling is performed on a first feature of a first point cloud of a target object. For example, upsampling is performed on a first feature of sparse point cloud 130 of the target object. It can be understood that, in a deep learning model, a feature is an abstract conception and does not necessarily correspond to a certain or some physical meanings of the target object. For the sake of convenience, a feature regarding the target object is called the first feature. It can be understood that if F is used to represent a dimension of a feature specific to each piece of point cloud (for example, representing a length of the number of digits of the feature), a dimension of the first feature is N×F. It can be understood that a dimension of a reference feature of reference point cloud of a reference object is KN×F.

In some embodiments, the first feature may be determined in the following manner. Sparse point cloud 130 is obtained by scanning the target object with a hardware device. The first feature is determined by using a machine learning model and based on sparse point cloud 130. As an example, the machine learning model may be a trained deep learning model, and the deep learning model generates the first feature based on sparse point cloud 130.

In some embodiments, the hardware device may include a laser radar.

In some embodiments, performing upsampling on the first feature of sparse point cloud 130 of the target object includes the following: multiple instances of sampling may be performed on the first feature so as to make the dimension of the first feature be the same as the dimension of the reference feature. As an example, multiple instances of sampling may be performed on the first feature so as to make the dimension of the first feature subjected to upsampling (also called an upsampled feature) reach KN×F, namely, being the same as the dimension of the reference feature.

As for the process of implementing upsampling, an example implementation of upsampling will be described independently below with reference to FIG. 5A and FIG. 5B.

At block 204, a reference feature of a second point cloud of the reference object is determined. For example, a reference feature of reference point cloud 140 of the reference object is determined. The reference object is a pre-determined regular object, for example, a standard ball. Thus, the reference point cloud of the reference object is uniform spherical point cloud, and a distance between each piece of point cloud in the spherical point cloud and its adjacent point cloud is equal. The number of points of the reference point cloud needs to be KN×3, namely, the number of points that dense point cloud 150 has.

In some embodiments, the reference feature may also be determined by using the machine learning model and based on reference point cloud 140, which is similar to the mode of obtaining the first feature. As an example, the machine learning model may be a trained deep learning model, and the deep learning model generates the reference feature based on reference point cloud 140. It can be understood that the dimension of the reference feature is KN×F.

At block 206, a second feature is determined based on the first feature subjected to upsampling and the reference feature. It can be understood that the dimensions of both the upsampled feature and the reference feature are KN×F and will be input into the deep learning model to determine the second feature, and the dimension of the second feature is KN×3, which is the same as the number of points of the reference point cloud. The second feature may be construed as a motion vector, which causes a shape of the reference object to be "transformed" into a shape of the target object by indicating how the reference point cloud moves.

As for the process of determining the second feature, an example implementation of determining the second feature will be described independently below with reference to FIG. 6A, FIG. 6B, and FIG. 7.

At block 208, a third point cloud of the target object is generated based on the second feature and the second point cloud of the reference object, and the third point cloud has a larger number of points than the first point cloud. For example, dense point cloud 150 is generated based on the second feature and reference point cloud 140. The number of points of dense point cloud is KN×3 and is the same as the number of points of reference point cloud 140.

In this way, an effect of increasing N pieces of point cloud in sparse point cloud 130 of the target object to KN pieces of point cloud in dense point cloud 150 is achieved. Through embodiments of the present disclosure, a point cloud of the target object can be made denser, with enhanced accuracy, such that description of the target object is further detailed. Meanwhile, the denser point cloud is obtained by transforming the reference point cloud, and is therefore not unduly impacted by noise, and a good effect can also be achieved even in a non-laboratory environment.

Figure 3:
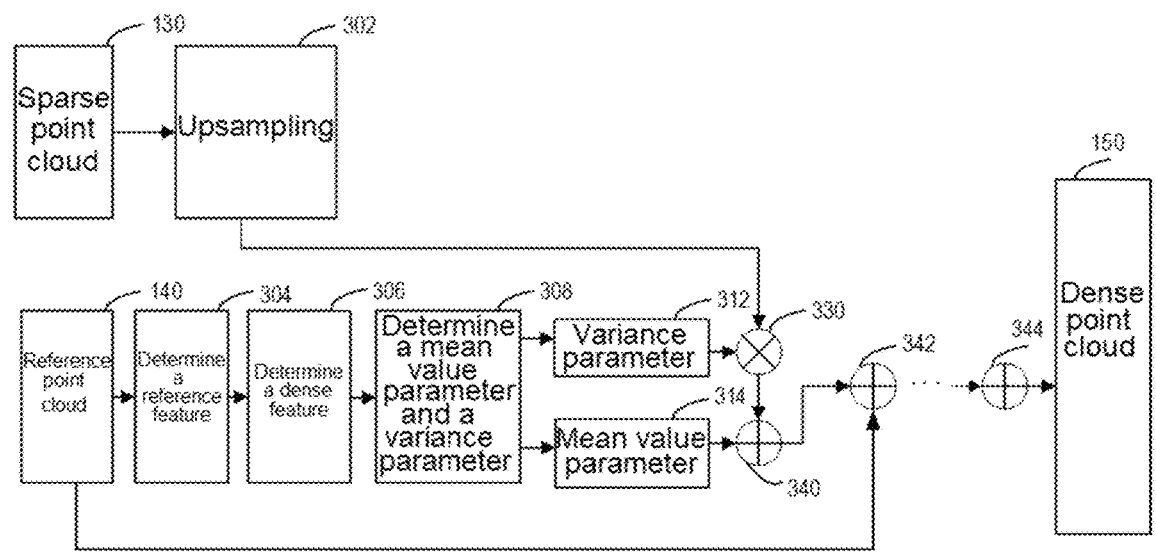
FIG. 3 shows a block diagram of a method for processing point clouds according to an example implementation of the present disclosure.

FIG. 3 shows a block diagram of method 200 for processing point clouds according to an example implementation of the present disclosure.

A step of block 202 may be configured and implemented at block 302. Sparse point cloud 130 is input into block 302 to obtain a feature regarding the target object (namely, the first feature).

A step of block 204 may be configured and implemented at block 304 to determine the reference feature.

A step of block 206 may be configured and implemented at block 306 and block 308 to determine the second feature.

At block 306, the reference feature is input, and a dense feature is determined. At block 308, based on the dense feature, variance parameter 312 (also called a first parameter) and mean value parameter 314 (also called a second parameter) may be determined. The first feature may be multiplied by variance parameter 312 (at block 330) by using a matrix multiplication, and the product obtained by multiplication is added with mean value parameter 314 to obtain the second feature (at block 340).

A step of block 208 may be configured and implemented at block 342 through block 344, and the second feature is added with the reference point cloud to obtain dense point cloud 150.

It is worth noting that method 200 may be iteratively executed, to optimize the effect of the obtained dense point cloud.

Figure 4:
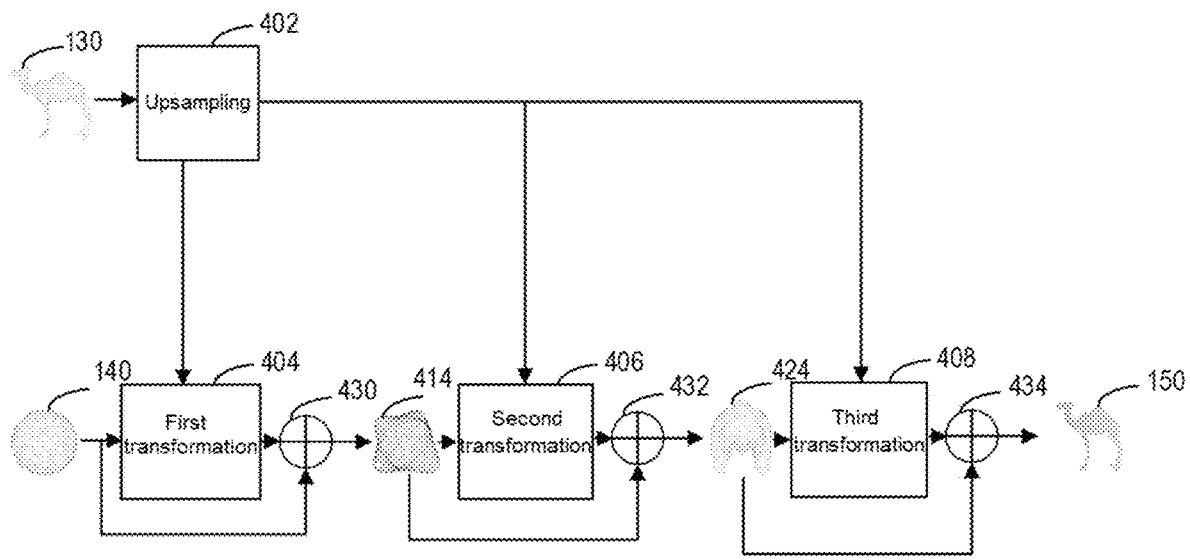
FIG. 4 shows a block diagram of iteration of a method for processing point clouds according to an example implementation of the present disclosure.

FIG. 4 shows a block diagram of iteration of method 200 for processing point clouds according to an example implementation of the present disclosure.

In some embodiments, a fourth point cloud may also be generated based on the upsampled feature and dense point cloud 150, where the fourth point cloud has the same number of points as the dense point cloud. Specifically, as shown in FIG. 4, steps of block 204 and block 206 may be generally called "transformation."

After upsampling 402 and first transformation 404, result 414 of the first transformation (also referred to herein as a fourth point cloud) may be obtained via block 430. When fourth point cloud 414 has a shape preliminarily similar to the sparse point cloud but does not meet a target effect, fourth point cloud 414 may be subjected to second transformation 406 so as to obtain result 424 of the second transformation (also referred to herein as a fifth point cloud) via block 432. When fifth point cloud 424 has a shape more similar to the sparse point cloud but still does not meet the target effect, fifth point cloud 424 may be subjected to third transformation 408 so as to obtain a result, namely, dense point cloud 150, of the third transformation via block 434.

Certainly, the number of times of transformation (namely, the number of times of iteration of method 200) is not limited by the present disclosure. It can be understood that such process may be repeated many times so as to achieve a better transformation effect. Starting with the process of the second transformation, the reference point cloud as a reference is the point cloud after last transformation, so the point cloud is more similar to the target object. Thus, repetition may be performed many times as needed so as to achieve a better effect. As an example, when a difference (especially, an outline difference) between dense point cloud 150 after a certain transformation and sparse point cloud 130 is detected to be smaller than a threshold value, iteration is stopped.

Figure 5A:
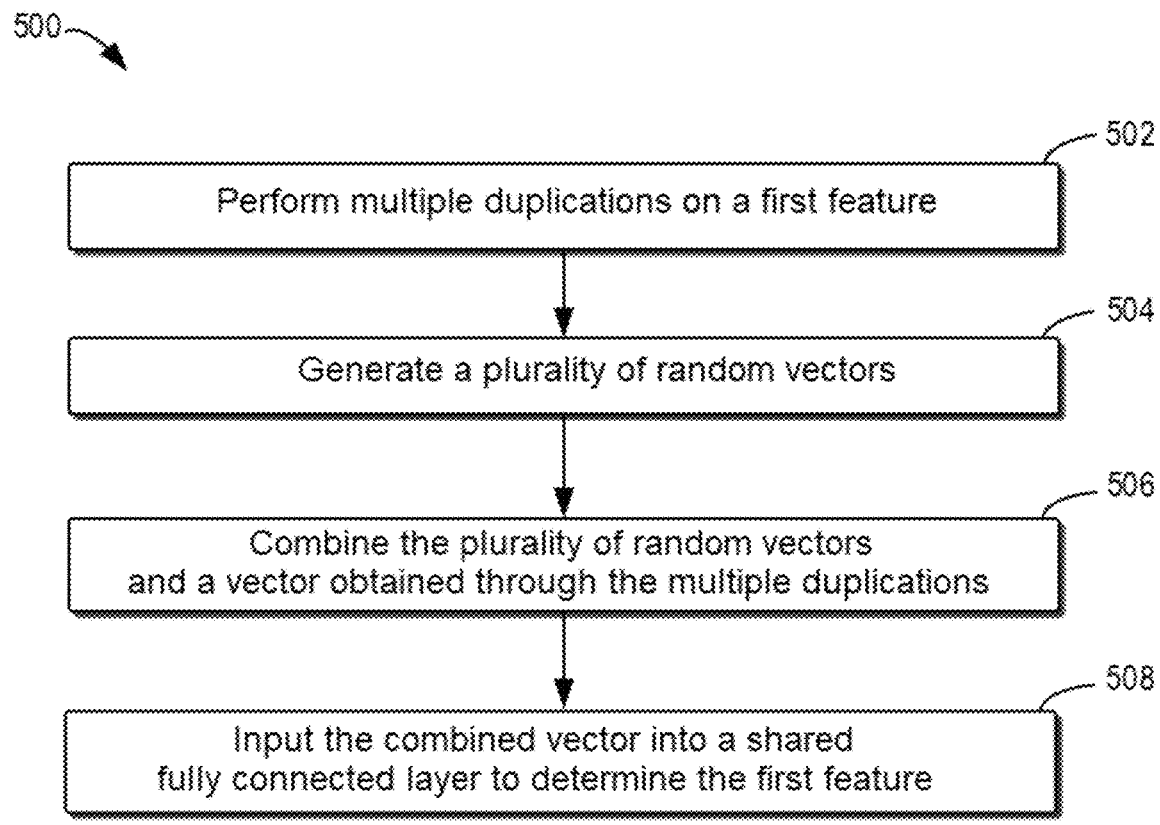
FIG. 5A shows a flow chart of an upsampling process according to an example implementation of the present disclosure.
Figure 5B:
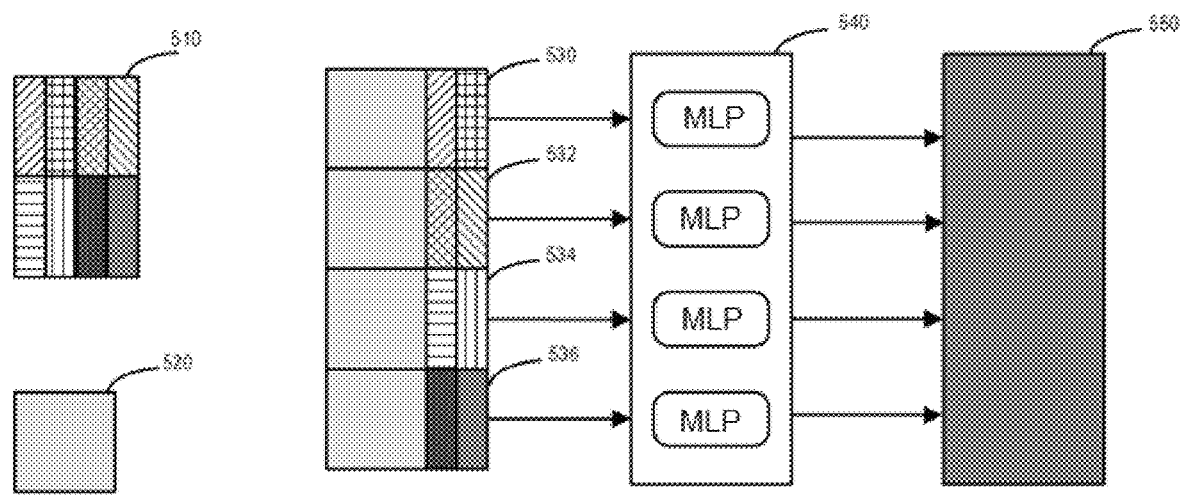
FIG. 5B shows a block diagram of an upsampling process according to an example implementation of the present disclosure.

FIG. 5A shows a flow chart of upsampling process 500 according to an example implementation of the present disclosure. FIG. 5B shows a block diagram of upsampling process 500 according to an example implementation of the present disclosure. Upsampling process 500 will be described below with reference to FIG. 5A and FIG. 5B.

At block 502, the first feature may be duplicated many times (for example, K times) so as to obtain a vector with the dimension being KN×F. For example, first feature 520 may be duplicated four times (K=4) to obtain a vector of 4N×F.

At block 504, a random vector may be generated. For example, N random vectors with the dimension being 2 are generated, where each of the random vectors may be generated randomly. For example, 8 random vectors with the dimension being 2 may be generated, as shown in vector set 510.

At block 506, the plurality of random vectors are combined with the vector obtained after multiple duplications at block 502. For example, each first feature 520 and two random vectors are combined to obtain vector 530, vector 532, vector 534, and vector 536.

At block 508, the combined vectors are input into shared fully connected layer 540 to determine upsampled feature 550. For example, vector 530, vector 532, vector 534, and vector 536 are input into fully connected layer 540, illustratively comprising a plurality of multi-layer perceptron (MLP) instances as shown, to obtain upsampled feature 550.

Upsampled feature 550 determined in this way has a dimension of KN×F, which is convenient for participation in the subsequent process. In the meantime, it can be more efficient and flexible to use a dedicated module in FIG. 5B to obtain the upsampled feature. For example, when needed, a model may be especially trained for some categories, for example, separately trained for processing buildings, animals, and the like. Similar reasons may indicate suitability of a dedicated module for the illustrative embodiments shown in FIG. 6B and FIG. 7, as described below.

In some embodiments, determining the second feature includes: determining the reference feature based on the reference point cloud by using a machine learning model; and performing multiple instances of feature extraction on the reference feature to obtain a dense feature.

Figure 6A:
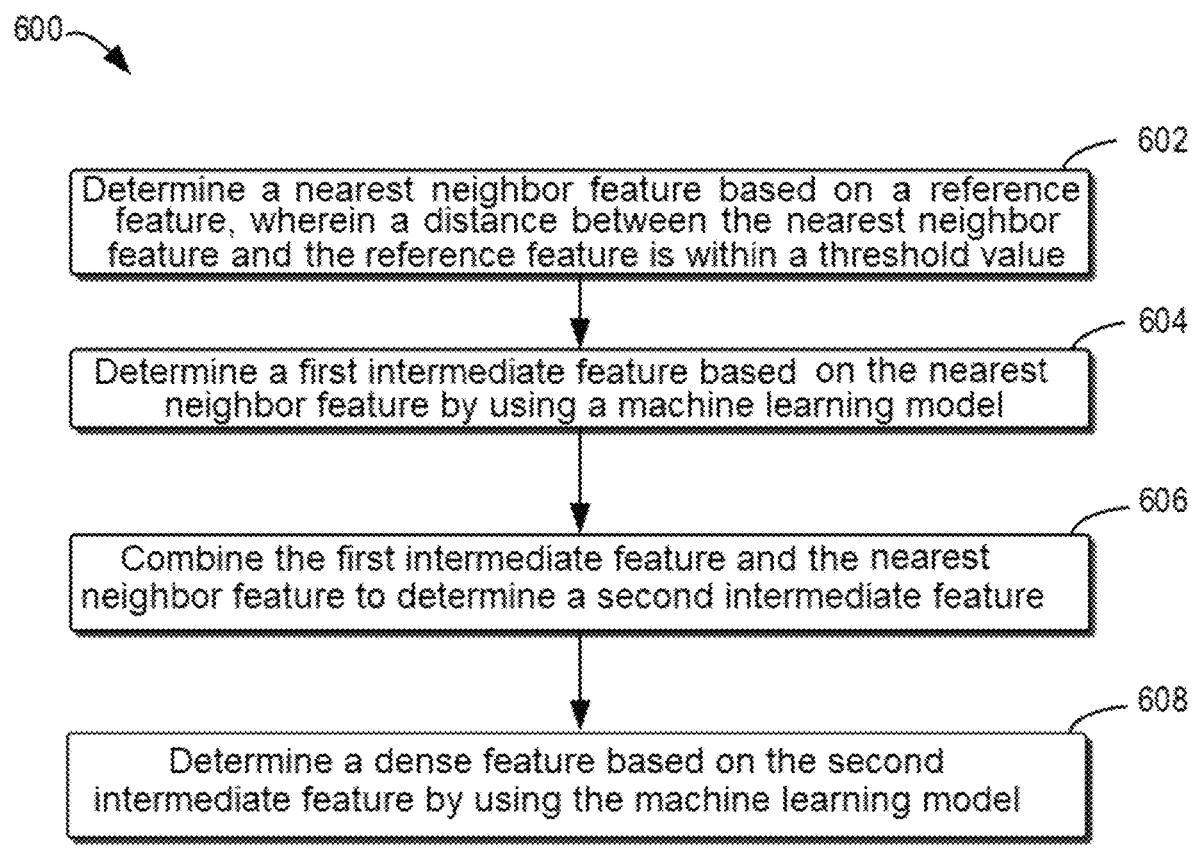
FIG. 6A shows a flow chart of a process for determining a dense feature according to an example implementation of the present disclosure.
Figure 6B:
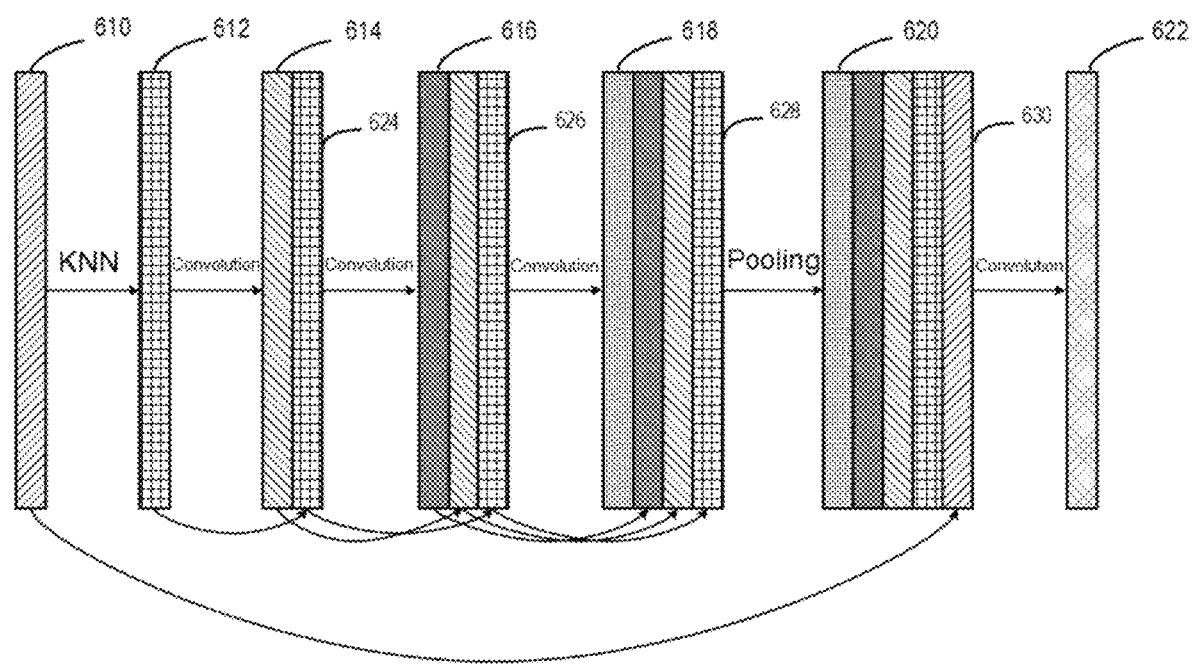
FIG. 6B shows a block diagram of a process for determining a dense feature according to an example implementation of the present disclosure.

FIG. 6A shows a flow chart of process 600 for determining a dense feature according to an example implementation of the present disclosure. FIG. 6B shows a block diagram of process 600 for determining a dense feature according to an example implementation of the present disclosure. Process 600 for determining a dense feature will be described below with reference to FIG. 6A and FIG. 6B.

At block 602, a nearest neighbor feature is determined based on the reference feature, and a distance between the nearest neighbor feature and the reference feature is within a threshold value. As an example, M features nearest to the reference feature in distance (for example, a cosine distance) may be determined by using a nearest neighbor algorithm (for example, KNN). In this way, the dimension of the nearest neighbor feature is KN×F×M. For example, nearest neighbor feature 612 is obtained through the KNN algorithm performed on reference feature 610.

In the KNN algorithm, distances between a predicted point and all points are computed, then saved and ranked, and first K values (for the sake of distinguishing, K=M in the present embodiment) are selected. Features selected in this way are in the same or similar categories, such that the model can provide a more accurate effect.

At block 604, based on the nearest neighbor feature, a first intermediate feature is determined by using a machine learning model (for example, a convolutional neural network (CNN)). For example, based on nearest neighbor feature 612, intermediate feature 614 is determined through CNN, and the dimension of intermediate feature 614 is KN×F×m.

At block 606, the first intermediate feature and the nearest neighbor feature are combined to determine a second intermediate feature. For example, intermediate feature 614 and nearest neighbor feature 612 are combined to obtain intermediate feature 624. The dimension of intermediate feature 614 is KN×F×M, and the dimension of nearest neighbor feature 612 is KN×F×M, so nearest neighbor feature 612 and intermediate feature 614 can be spliced to obtain intermediate feature 624 with the dimension being KN×2F×M.

At block 608, based on the intermediate feature, dense feature 622 is determined by using a machine learning model. As an example, dense feature extraction may also be performed again based on intermediate feature 624. For example, based on intermediate feature 624, intermediate feature 616 is determined by using a machine learning model. Intermediate feature 616 and intermediate feature 624 are combined to obtain intermediate feature 626. Based on a similar reason, the dimension of intermediate feature 626 is KN×3F×M.

Similarly, based on intermediate feature 626, intermediate feature 618 is determined by using a machine learning model. Intermediate feature 626 and intermediate feature 618 are combined to determine intermediate feature 628. Based on a similar reason, the dimension of intermediate feature 628 is KN×4F×M.

A max-pooling operation may be performed on intermediate feature 628 so as to obtain feature 620 (it may be construed as reducing dimension of M into dimension of 1). Feature 630 after combining feature 620 obtained after pooling and intermediate feature 628 is input into CNN, so as to obtain dense feature 622. The dimension of the dense feature is KN×F.

In the process of dense feature extraction, multiple combinations and extractions of the intermediate features generated in the extraction process are involved, so more detailed features regarding the reference object can be explored, so that augmentation of the sparse point cloud is more accurate, and more details are reflected.

In some embodiments, determining the second feature may further include: performing location coding on the reference point cloud; determining a mean value parameter and a variance parameter based on the dense feature and location codes; and determining the second feature based on the mean value parameter, the variance parameter, and the upsampled feature.

Figure 7:
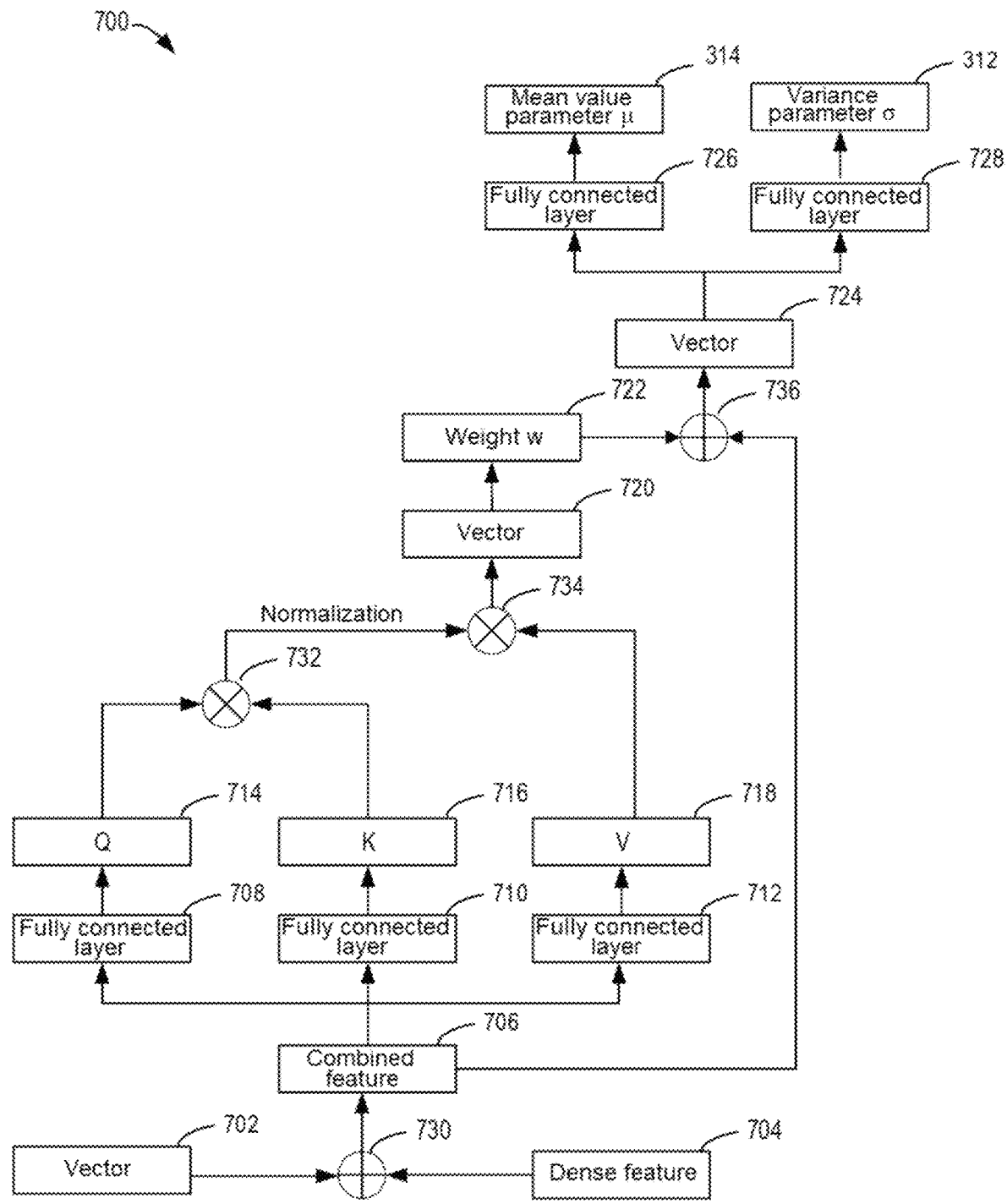
FIG. 7 shows a block diagram of a process for determining a mean value parameter and a variance parameter according to an example implementation of the present disclosure.

FIG. 7 shows a block diagram of process 700 for determining a mean value parameter and a variance parameter according to an example implementation of the present disclosure. Variance parameter 312 and mean value parameter 314 in FIG. 3 may be determined by a model shown in FIG. 7.

In some embodiments, determining the mean value parameter and the variance parameter based on the dense feature and the location codes includes: combining the dense feature and the location codes to determine a combined feature; and determining the mean value parameter and the variance parameter by using an attention mechanism of the machine learning model based on the combined feature.

Sparse point cloud 130 is duplicated K times so as to obtain vector 702 with the dimension being KN×3. Location-based coding is performed on vector 702 so that a relative location relation between pieces of point cloud is still maintained after coding.

A location code and dense feature 704 are mixed at block 730 to obtain combined feature 706, also referred to herein as vector 706. Combined feature 706 is respectively input into three fully connected layers, namely, fully connected layer 708, fully connected layer 710, and fully connected layer 712. Thus, three vectors, namely, vector Q 714, vector K 716, and vector V 718 may be obtained respectively. Vector Q 714 and vector K 716 may be multiplied at block 732 and subjected to normalization (softmax). The vector subjected to normalization is multiplied at block 734 by vector V 718 to generate vector 720. Vector 720 may be multiplied by weight w 722 to be added to combined feature 706 at block 736. Vector 724 obtained after the addition is respectively input into two fully connected layers, namely, fully connected layer 726 and fully connected layer 728, so as to determine variance parameter 312 (may also be represented with σ) and mean value parameter 314 (may also be represented with μ). Weight w is obtained via pre-training.

In an embodiment, vector 706 may be computed by the following Equation (1):

$$F_y = T\left(\frac{Q_{F_x} K_{F_x}^T}{\sqrt{d}}\right) V_{F_x} \quad \text{Equation (1)}$$

where $F_y$ represents vector 706; $Q_{F_x}$ represents vector Q; $K_{F_x}^T$ represents transposition of vector K; d is a pre-set value and may be construed as a normalization parameter, which is related to a distance between vector Q and vector K; $V_{F_x}$ represents vector V; and T represents a normalization operation.

In some embodiments, the second feature may be determined by the following Equation (2):

$$y = x \times \sigma + \mu \quad \text{Equation (2)}$$

where y represents the second feature; x represents the upsampled feature; μ represents the mean value parameter; and σ represents the variance parameter.

It can be understood that the process shown in FIG. 7 may be called a multi-head attention mechanism, which is applied in the machine learning mechanism so as to improve accuracy of model output. A mutual relation of locations between pieces of point cloud may be learned more fully by using the attention mechanism, and mean value parameter μ and variance parameter σ (or collectively called transformation parameters) are generated. Linear weighting of the transformation parameter and the first feature which is subjected to upsampling may be construed as a motion process, the motion process (or repeated multiple motion processes) may finally realize accurate interpolation of original point cloud of the target object, and thus sparse point cloud originally collected by a hardware device with limited performance is denser. In this way, hardware costs are reduced, 3D modeling effect will not be adversely impacted, and it is quite beneficial to subsequent virtual reality applications.

Figure 8:
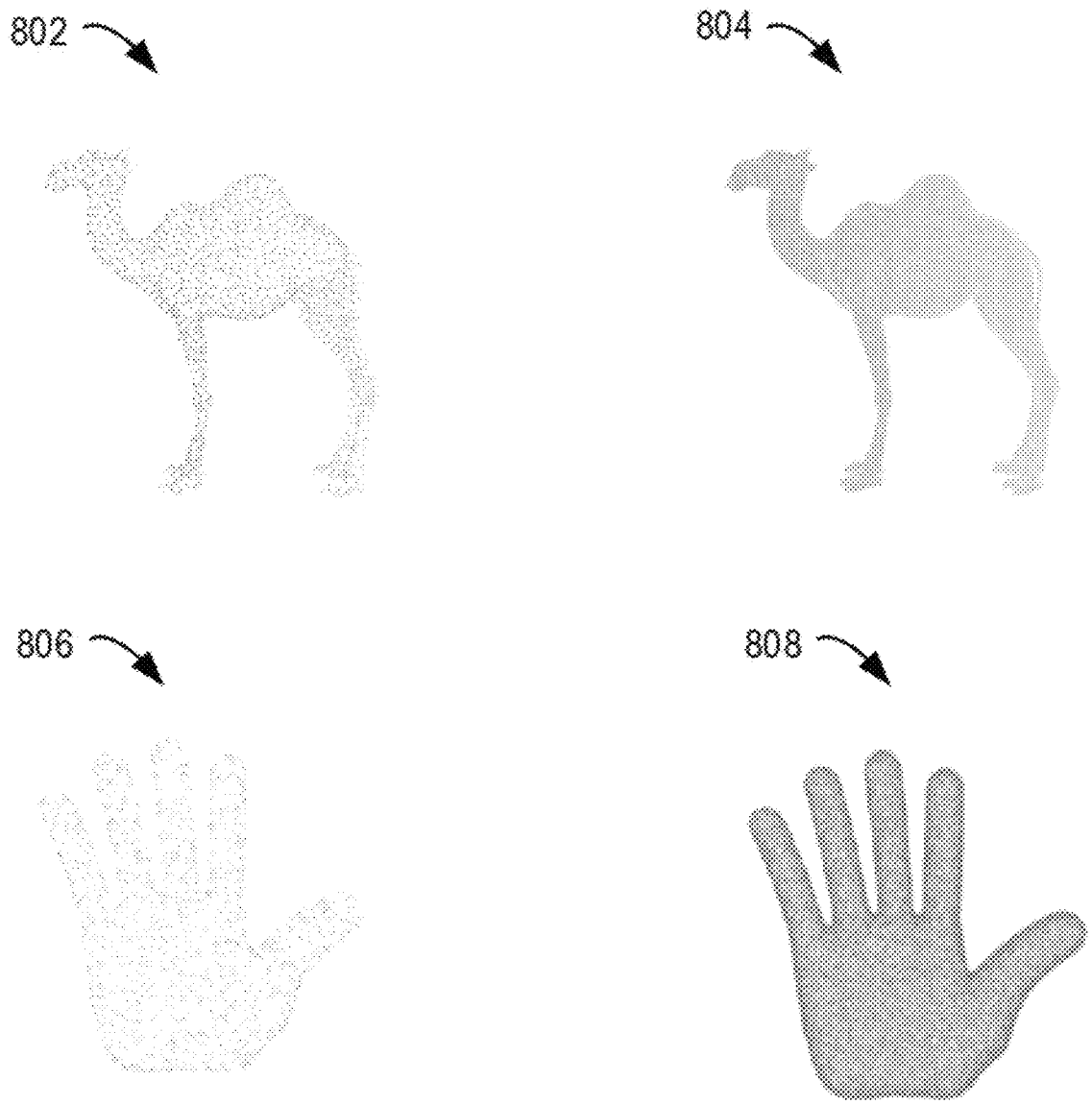
FIG. 8 shows a schematic diagram of comparison of sparse point cloud and dense point cloud according to an example implementation of the present disclosure.

FIG. 8 shows a schematic diagram of comparison of sparse point cloud and dense point cloud according to an example implementation of the present disclosure.

FIG. 8 shows an example of sparse point cloud 130 and dense point cloud 150. Specifically, comparison of sparse point cloud 802 and corresponding dense point cloud 804 as well as comparison of sparse point cloud 806 and corresponding dense point cloud 808 are shown. It can be seen that, through method 200 of the present disclosure, the dense point cloud obtained by processing the sparse point cloud is denser, the edge is smooth, and there is no abnormally protruding point cloud. In this way, an original point cloud may show more details of an object, and meanwhile, it is quite useful for subsequent applications.

Figure 9:
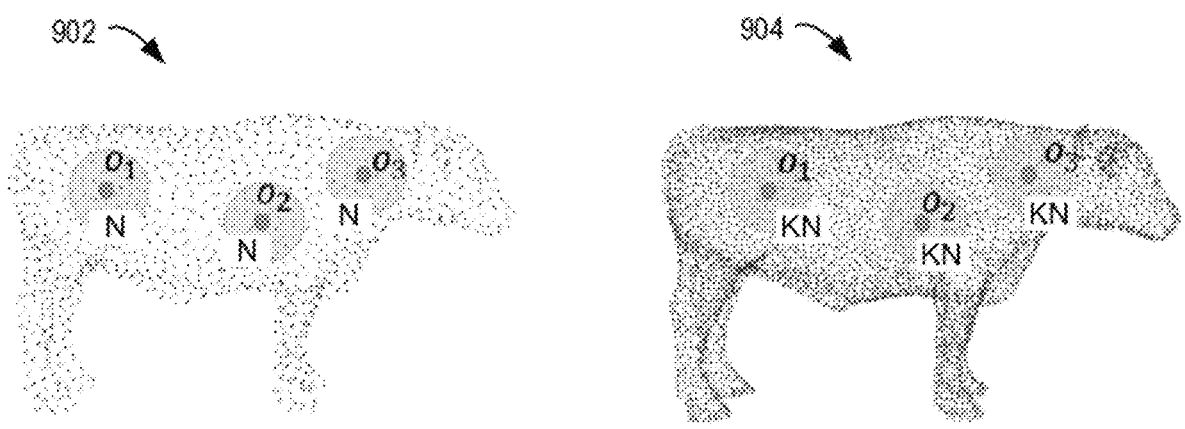
FIG. 9 shows a schematic diagram of a training strategy according to an example implementation of the present disclosure.

FIG. 9 shows a schematic diagram of a training strategy according to an example implementation of the present disclosure.

Due to the limit of a computing resource, during training of the machine learning model (for example, a deep learning model) which implements method 200, original point cloud 902 of the target object may be divided into a plurality of smaller pieces, and each piece includes a point cloud having a certain distance from its center (for example, small pieces with $O_1$ as a center, small pieces with $O_2$ as a center, small pieces with $O_M$ as a center, and the like). Similarly, point cloud 904 as a training target may also be divided into the same small pieces. A complete machine learning model is finally obtained by batch training of all the small pieces.

As an example, based on a 3D mesh model, the sparse point cloud and the dense point cloud are generated and respectively used as a sample set and a target set of training. M key points may be selected in the sparse point cloud to be used as $O_1, O_2 \ldots O_M$, these selected key points are used as a center of each small piece, and these small pieces include P pieces of point cloud closest to each center. Similarly, M key points may be selected in the dense point cloud to be used as $O_1, O_2 \ldots O_M$, these selected key points are used as a center of each small piece, and these small pieces include KP pieces of point cloud closest to each center. Thus, the whole model may be divided into M pieces of sparse point cloud including small pieces with the number of points being P for serving as the sample set and M pieces of dense point cloud including small pieces with the number of points being KP for serving as the target set.

As an example, when the dense point cloud is generated based on 3D mesh model, a Poisson Disk Sampling method may be used, and a point cloud after sampling is used as the target set $R^{kN}$. Then, random sampling is performed on the target set to obtain the sample set $R^N$. When the M key points are to be selected, M key points, namely, $O_1, O_2 \ldots O_M$ may be selected by using a farthest point sampling mode. For each key point, the closest P points around the key point may be selected as small pieces. Thus, the whole point cloud is divided into M small pieces to be trained. Benefits of batch training of the small pieces are that real and real-time large-scene point cloud can be processed, for example, an urban scene.

Through method 200 for point cloud processing of the present disclosure, a feature of a target object can be learned, based on which transformation of a reference point cloud can be guided, so as to realize interpolation of the point cloud of the target object. An obtained interpolated value is high in quality and high in noise immunity. In addition, a degree of interpolation of the number of pieces of point cloud can be changed simply through parameter K.

Figure 10:
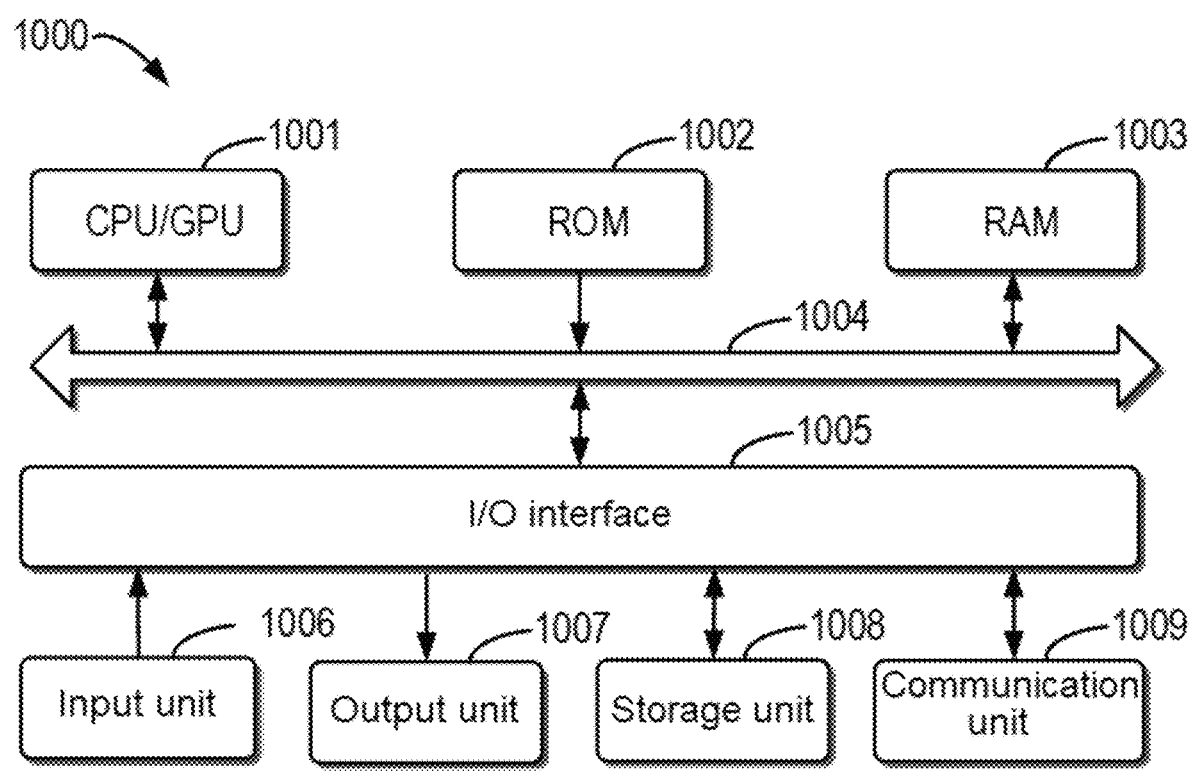
FIG. 10 shows a block diagram of a device for processing point clouds according to an example implementation of the present disclosure.

FIG. 10 shows a schematic block diagram of device 1000 that may be used to implement embodiments of the present disclosure. Device 1000 may be a device or apparatus as described in embodiments of the present disclosure. As shown in FIG. 10, device 1000 includes central processing unit (CPU) and/or graphics processing unit (GPU) 1001 that may perform various appropriate actions and processing according to computer program instructions stored in read-only memory (ROM) 1002 or computer program instructions loaded from storage unit 1008 into random access memory (RAM) 1003. Various programs and data needed for the operation of device 1000 may also be stored in RAM 1003. CPU/GPU 1001, ROM 1002, and RAM 1003 are connected to one other through bus 1004. Input/output (I/O) interface 1005 is also connected to bus 1004. Although not shown in FIG. 10, device 1000 may also include a co-processor.

A plurality of components in device 1000 are connected to I/O interface 1005, including: input unit 1006, such as a keyboard and a mouse; output unit 1007, such as various types of displays and speakers; storage unit 1008, such as a magnetic disk and an optical disc; and communication unit 1009, such as a network card, a modem, and a wireless communication transceiver. Communication unit 1009 allows device 1000 to exchange information/data with other devices via a computer network, such as the Internet, and/or various telecommunication networks.

The various methods or processes described above may be executed by CPU/GPU 1001. For example, in some embodiments, the method 200 or other methods or processes disclosed herein may be implemented as a computer software program that is tangibly included in a machine-readable medium, such as storage unit 1008. In some embodiments, part or all of the computer program may be loaded and/or installed to device 1000 via ROM 1002 and/or communication unit 1009. When the computer program is loaded into RAM 1003 and executed by CPU/GPU 1001, one or more steps or actions of the methods or processes described above may be executed.

In some embodiments, the methods and processes described above may be implemented as a computer program product. The computer program product may include a computer-readable storage medium on which computer-readable program instructions for executing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be understood as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber-optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operations of the present disclosure may be assembly instructions, Instruction Set Architecture (ISA) instructions, machine instructions, machine-related instructions, microcode, firmware instructions, status setting data, or source code or object code written in any combination of one or more programming languages including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions may be provided to a processing unit of a general-purpose computer, a special-purpose computer, or other programmable data processing apparatuses, thereby producing a machine, such that these instructions, when executed by the processing unit of the computer or the other programmable data processing apparatuses, produce an apparatus for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to work in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments, and their corresponding technical improvements, so as to enable persons of ordinary skill in the art to understand the various embodiments disclosed herein.

What is claimed is:

1. A method comprising:
    performing upsampling on a first feature of a first point cloud of a target object;
    determining a reference feature of a second point cloud of a reference object;
    determining a second feature based on the first feature subjected to upsampling and the reference feature; and
    generating a third point cloud of the target object based on the second feature and the second point cloud of the reference object, wherein the third point cloud has a larger number of points than the first point cloud;
    wherein determining the second feature comprises:
        performing multiple instances of feature extraction on the reference feature to obtain a dense feature;
        performing location coding on the second point cloud to generate location codes;
        determining a first parameter and a second parameter based on the dense feature and the location codes; and
        determining the second feature based on the first parameter, the second parameter, and the first feature subjected to upsampling.

2. The method according to claim 1, further comprising:
    generating a fourth point cloud based on the first feature subjected to upsampling and the third point cloud, wherein the fourth point cloud has the same number of points as the third point cloud.

3. The method according to claim 1, wherein performing upsampling on the first feature of the first point cloud of the target object comprises:
    performing multiple instances of sampling on the first feature so as to make a dimension of the first feature be the same as a dimension of the reference feature.

4. The method according to claim 1, further comprising:
    scanning the target object by a hardware device to obtain the first point cloud; and
    determining the first feature based on the first point cloud by using a machine learning model.

5. The method according to claim 4, wherein the hardware device comprises a laser radar.

6. The method according to claim 1, wherein determining the second feature further comprises:
    determining the reference feature based on the second point cloud by using a machine learning model.

7. The method according to claim 6, wherein performing multiple instances of feature extraction on the reference feature to obtain the dense feature comprises:
    determining a nearest neighbor feature based on the reference feature, wherein a distance between the nearest neighbor feature and the reference feature is within a threshold value;
    determining a first intermediate feature based on the nearest neighbor feature by using the machine learning model;
    combining the first intermediate feature and the nearest neighbor feature to determine a second intermediate feature; and
    determining the dense feature based on the second intermediate feature by using the machine learning model.

8. The method according to claim 1, wherein determining the first parameter and the second parameter based on the dense feature and the location codes comprises:
    combining the dense feature and the location codes to determine a combined feature; and
    determining the first parameter and the second parameter based on the combined feature by using an attention mechanism of a machine learning model.

9. An electronic device, comprising:
    at least one processor; and
    memory coupled to the at least one processor, wherein the memory has instructions stored therein which, when executed by the at least one processor, cause the electronic device to perform actions comprising:
        performing upsampling on a first feature of a first point cloud of a target object;
        determining a reference feature of a second point cloud of a reference object;
        determining a second feature based on the first feature subjected to upsampling and the reference feature; and generating a third point cloud of the target object based on the second feature and the second point cloud of the reference object, wherein the third point cloud has a larger number of points than the first point cloud;

wherein determining the second feature comprises:

performing multiple instances of feature extraction on the reference feature to obtain a dense feature;

performing location coding on the second point cloud to generate location codes;

determining a first parameter and a second parameter based on the dense feature and the location codes; and determining the second feature based on the first parameter, the second parameter, and the first feature subjected to upsampling.

10. The electronic device according to claim 9, wherein the actions further comprise:

generating a fourth point cloud based on the first feature subjected to upsampling and the third point cloud, wherein the fourth point cloud has the same number of points as the third point cloud.

11. The electronic device according to claim 9, wherein performing upsampling on the first feature of the first point cloud of the target object comprises:

performing multiple instances of sampling on the first feature so as to make a dimension of the first feature be the same as a dimension of the reference feature.

12. The electronic device according to claim 9, wherein the actions further comprise:

scanning the target object by a hardware device to obtain the first point cloud; and determining the first feature based on the first point cloud by using a machine learning model.

13. The electronic device according to claim 12, wherein the hardware device comprises a laser radar.

14. The electronic device according to claim 9, wherein determining the second feature further comprises:

determining the reference feature based on the second point cloud by using a machine learning model.

15. The electronic device according to claim 14, wherein performing multiple instances of feature extraction on the reference feature to obtain the dense feature comprises:

determining a nearest neighbor feature based on the reference feature, wherein a distance between the nearest neighbor feature and the reference feature is within a threshold value;

determining a first intermediate feature based on the nearest neighbor feature by using the machine learning model;

combining the first intermediate feature and the nearest neighbor feature to determine a second intermediate feature; and determining the dense feature based on the second intermediate feature by using the machine learning model.

16. The electronic device according to claim 9, wherein determining the first parameter and the second parameter based on the dense feature and the location codes comprises:

combining the dense feature and the location codes to determine a combined feature; and determining the first parameter and the second parameter based on the combined feature by using an attention mechanism of a machine learning model.

17. A computer program product tangibly stored on a non-transitory computer-readable medium and including computer-executable instructions that, when executed by a device, cause the device to perform actions comprising:

performing upsampling on a first feature of a first point cloud of a target object;

determining a reference feature of a second point cloud of a reference object;

determining a second feature based on the first feature subjected to upsampling and the reference feature; and generating a third point cloud of the target object based on the second feature and the second point cloud of the reference object, wherein the third point cloud has a larger number of points than the first point cloud;

wherein determining the second feature comprises:

performing multiple instances of feature extraction on the reference feature to obtain a dense feature;

performing location coding on the second point cloud to generate location codes;

determining a first parameter and a second parameter based on the dense feature and the location codes; and determining the second feature based on the first parameter, the second parameter, and the first feature subjected to upsampling.

18. The computer program product according to claim 17, wherein the actions further comprise:

generating a fourth point cloud based on the first feature subjected to upsampling and the third point cloud, wherein the fourth point cloud has the same number of points as the third point cloud.

19. The computer program product according to claim 17, wherein performing multiple instances of feature extraction on the reference feature to obtain the dense feature comprises:

determining a nearest neighbor feature based on the reference feature, wherein a distance between the nearest neighbor feature and the reference feature is within a threshold value;

determining a first intermediate feature based on the nearest neighbor feature by using a machine learning model;

combining the first intermediate feature and the nearest neighbor feature to determine a second intermediate feature; and determining the dense feature based on the second intermediate feature by using the machine learning model.

20. The computer program product according to claim 17, wherein determining the first parameter and the second parameter based on the dense feature and the location codes comprises:

combining the dense feature and the location codes to determine a combined feature; and determining the first parameter and the second parameter based on the combined feature by using an attention mechanism of a machine learning model.

* * * * *